United States Patent
Rhodes

(10) Patent No.: US 6,843,358 B1
(45) Date of Patent: Jan. 18, 2005

(54) ROTATABLE TRANSFER TRACK DEVICE

(76) Inventor: Arthur B. Rhodes, 901 Bean Rd., Sellersburg, IN (US) 47172

(*) Notice: Subject to any disclaimer, the term of this patent is extended or adjusted under 35 U.S.C. 154(b) by 0 days.

(21) Appl. No.: 10/404,643

(22) Filed: Apr. 1, 2003

Related U.S. Application Data

(60) Provisional application No. 60/369,304, filed on Apr. 2, 2002.

(51) Int. Cl.[7] .............................................. B65G 37/00
(52) U.S. Cl. .................. 198/369.5; 198/598; 198/465.1
(58) Field of Search ........................... 198/465.1, 465.2, 198/369.5, 578, 587, 598; 104/88.01, 91, 99, 124, 172.4, 35, 39, 48, 50

(56) References Cited

U.S. PATENT DOCUMENTS

| | | |
|---|---|---|
| 419,594 A | 1/1890 | Morgan |
| 1,878,605 A | 9/1932 | Schmidt et al. |
| 2,360,505 A | 10/1944 | Medenwald et al. |
| 2,940,400 A | 6/1960 | Harrison |
| 3,176,626 A | 4/1965 | Hawkins |
| 3,314,377 A | 4/1967 | Dehne |
| 3,595,174 A | 7/1971 | Juve |
| 4,291,797 A * | 9/1981 | Ewertowski ................. 198/349 |
| 4,349,097 A * | 9/1982 | Curti ........................ 198/369.5 |
| 4,599,025 A * | 7/1986 | Borsuk et al. ............ 414/793.4 |
| 4,797,052 A * | 1/1989 | Ohta et al. ................ 414/744.3 |
| 5,080,019 A * | 1/1992 | Takemura et al. ........ 104/88.03 |
| 5,111,750 A | 5/1992 | Nozaki et al. |
| 5,195,437 A * | 3/1993 | Wallace et al. ........... 104/172.3 |
| 6,012,568 A * | 1/2000 | Kane ........................... 198/817 |

* cited by examiner

*Primary Examiner*—Douglas Hess
(74) *Attorney, Agent, or Firm*—James E. Cole; Charles G. Lamb; Middleton Reutlinger

(57) ABSTRACT

A transfer conveying mechanism includes a transfer track supported by a transfer support arm. Above the transfer track is a chain guide and depending therefrom are transfer sprockets. Extending about the transfer sprockets is an endless chain having at least one push dog attached thereto. The push dogs move the carrier into and across the transfer track. Attached above the transfer support arm is a sprocket, which is rotatably connected to a pivot plate. The pivot plate is attached to a structural steel assembly from which the transfer conveying mechanism depends. As the sprocket is rotated by a motor and chain transmission, the transfer conveying mechanism rotates in order to direct a carrier to a desired conveyor track.

27 Claims, 11 Drawing Sheets

ROTATABLE TRANSFER TRACK DEVICE

CROSS-REFERENCE TO PRIOR APPLICATION

This application claims priority to U.S. Provisional Patent Application Ser. No. 60/369,304, filed on Apr. 2, 2002, which is incorporated herein by reference.

BACKGROUND OF THE INVENTION

1. Field of the Invention

The present invention relates to a rotatable transfer track device. More particularly, the present invention relates to a rotatable transfer allowing movement of workpiece carriers or trolleys from a first conveyor track to at least one second conveyor track aligned with or disposed at an angle to the first conveyor track.

2. Description of the Related Art

Conveying systems are used in manufacturing facilities to move workpieces from one workstation to another workstation through a preselected path. Typically in these conveying systems a carrier trolley is used to carry the workpiece along the preselected path of a conveyor track. Preferably these carrier trolleys engage a conveying mechanism, such as a conveyor belt or a chain, to move about the preselected path and disengage from the conveying mechanism at a workstation so to be stationary while work is performed on the work piece. Finally, the carriers may be re-engaged and moved through a manufacturing process until the workpieces are completed.

In view of the deficiencies of known conveyor systems it is apparent that a rotatable transfer track device is needed wherein a trolley may easily be directed from a first conveyor track to a second conveyor track and wherein the second conveyor track may be disposed at a plurality of angles to the first track ranging from about 0 to about 100 degrees in either a clockwise or counter-clockwise direction.

SUMMARY OF THE INVENTION

An object of the present invention is to provide a transfer track to move a carrier trolley from a first conveyor track to at least a second conveyor track.

Another object of the present invention is to provide a transfer track which may rotate through an arc of upto about 200 degrees to direct a carrier trolley to a second conveyor track.

An even further object of the present invention is to provide a conveying mechanism above a transfer track which rotates with the conveyor track to move a carrier trolley across the transfer track.

Specifically, a rotatable transfer track is provided comprising a first conveyor track having a first end and a second end, a second conveyor track having a first end and a second end, a transfer conveyor track pivotably disposed between the first and the second conveyor track and operably communicating therewith, a drive system, at least two sprockets, an endless chain extending about the at least two sprockets, and a plurality of pusher dogs operably connected to the chain. The transfer conveying mechanism is pivotably attached to a structural support and the transfer conveyor track rotates simultaneously therewith.

All of the above outlined objectives are to be understood as exemplary only and many more objectives of the invention may be gleaned from the disclosure herein. Therefore, no limiting interpretations of the objectives noted are to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
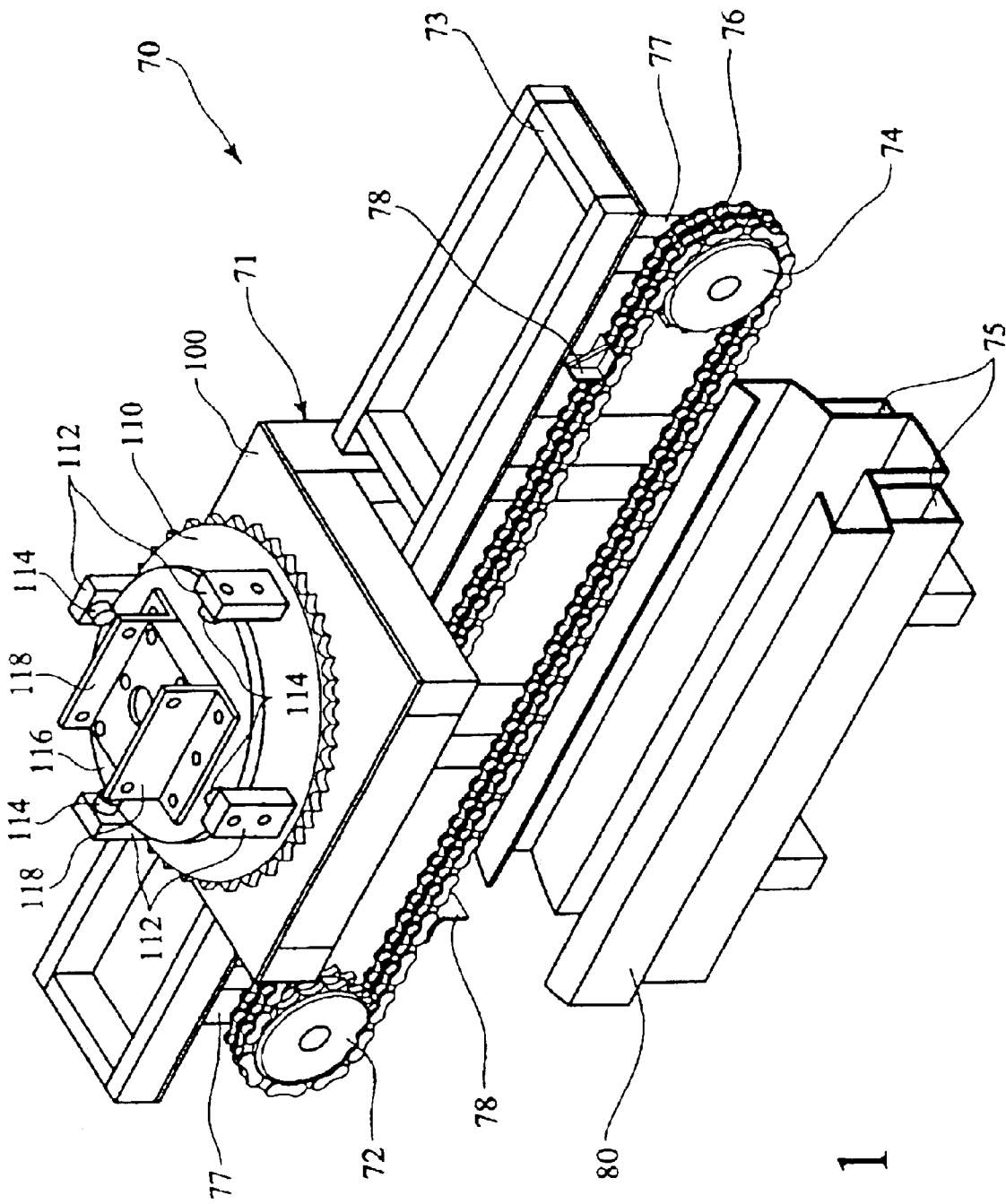
FIG. 1 is a perspective view of a rotatable track of the present invention.
Figure 2:
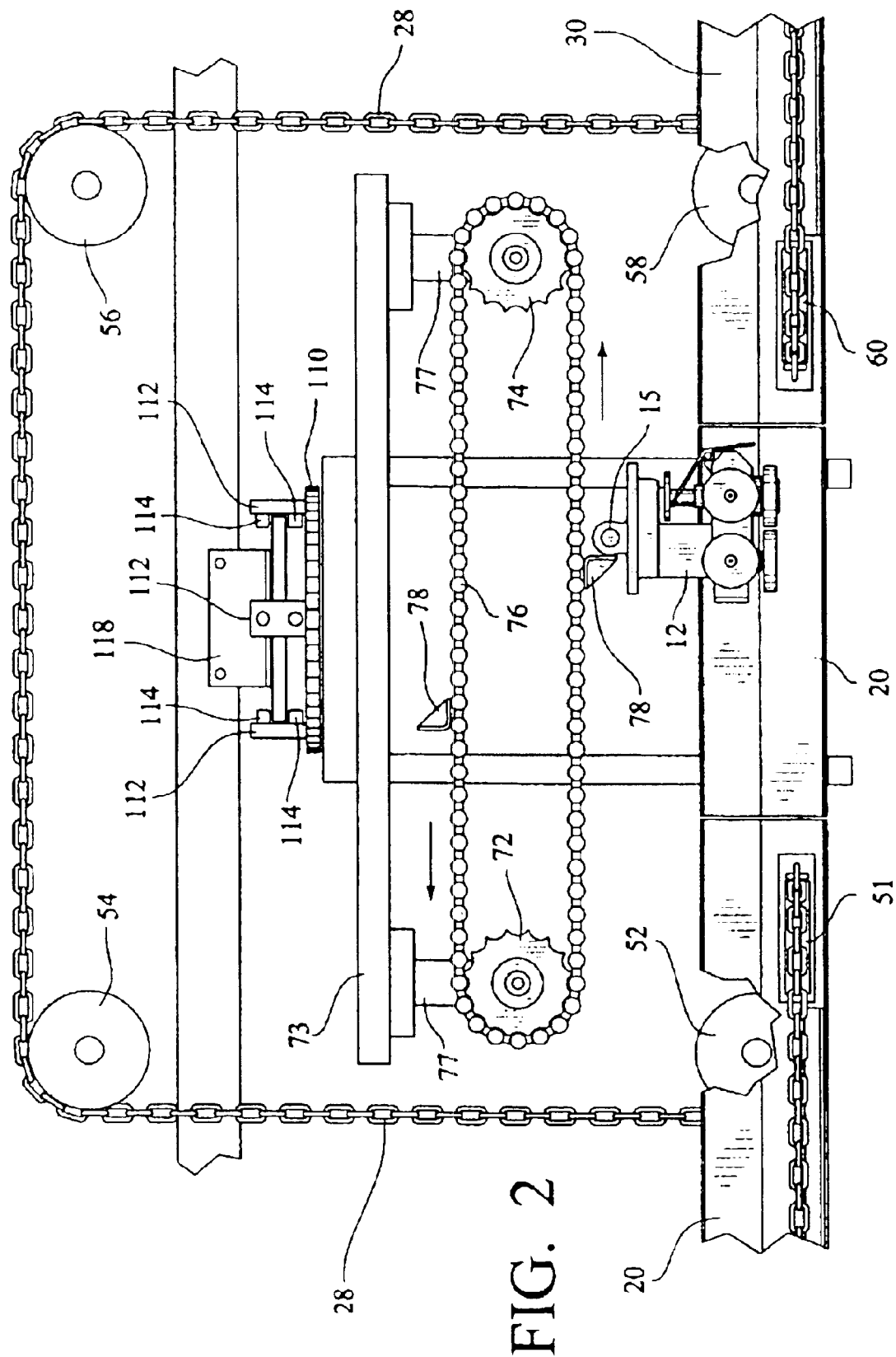
FIG. 2 is a side view of the transfer track of FIG. 1 with a cutaway of selected portions of the track.
Figure 3:
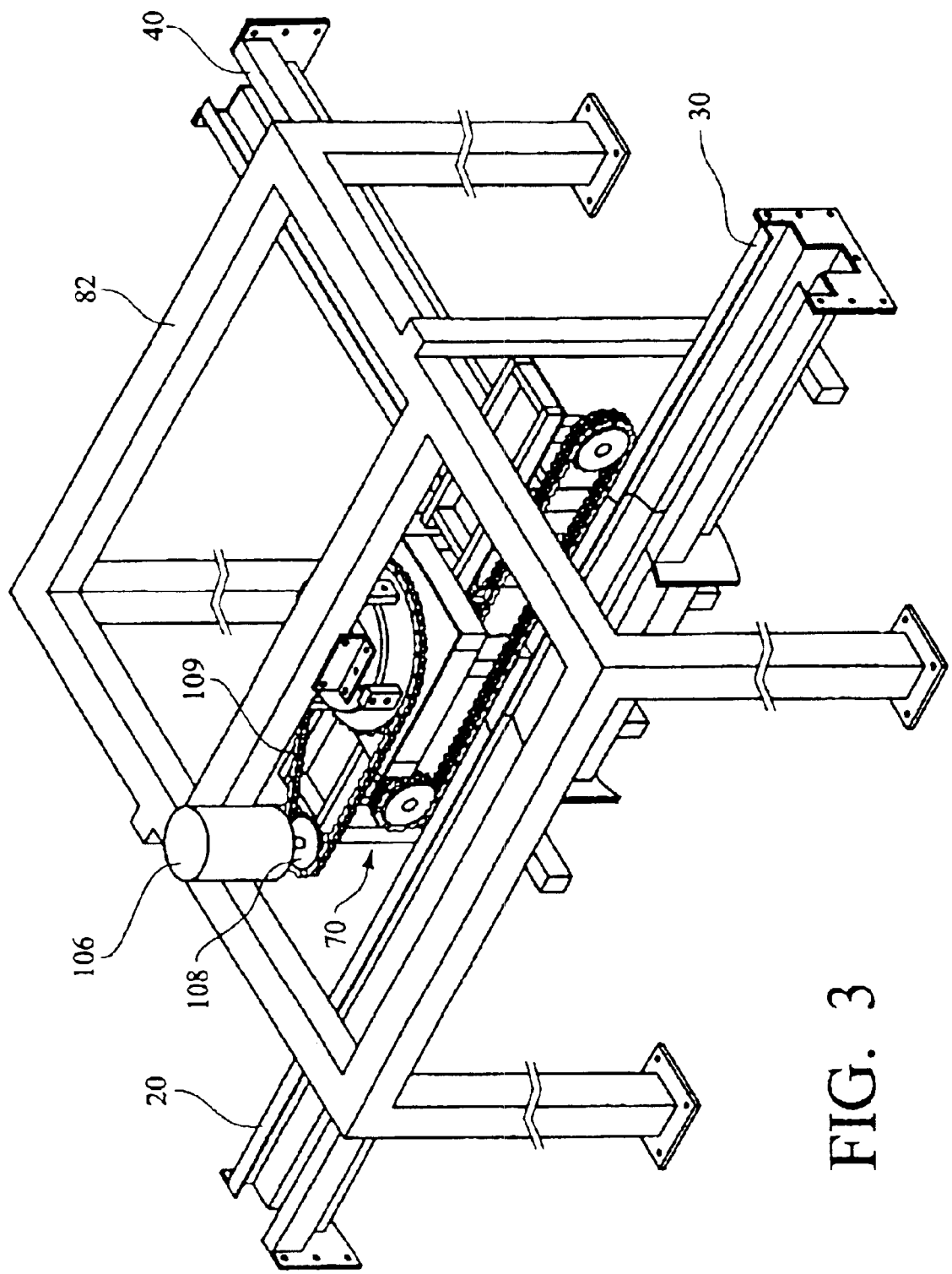
FIG. 3 shows a perspective view of the transfer track of FIG. 1 including structural support for the track.

Referring to FIGS. 1-6, a rotatable transfer track 70 is shown. The rotatable track 70 may be used generally to transfer a workpiece carrier or trolley 12, of FIG. 4, from a first conveyor track 20 to a second conveyor track 30, or a plurality of other conveyor tracks, for example a third conveyor track 40 shown as exemplary in FIG. 3. As shown in FIGS. 2 and 3 the second conveyor track 30 is linearly aligned with the first track 20. In addition, a plurality of other tracks may be disposed at an angle to the first conveyor track 20 and preferably within the same horizontal plane, as for example third conveyor track 40 in FIG. 3 or FIGS. 6a-6d. The rotatable transfer track 70 shown in FIG. 1, may rotate through an arc of about 100 degrees in both clockwise and counter-clockwise directions from its normally disposed position shown.

Carrier Trolley

Figure 4:
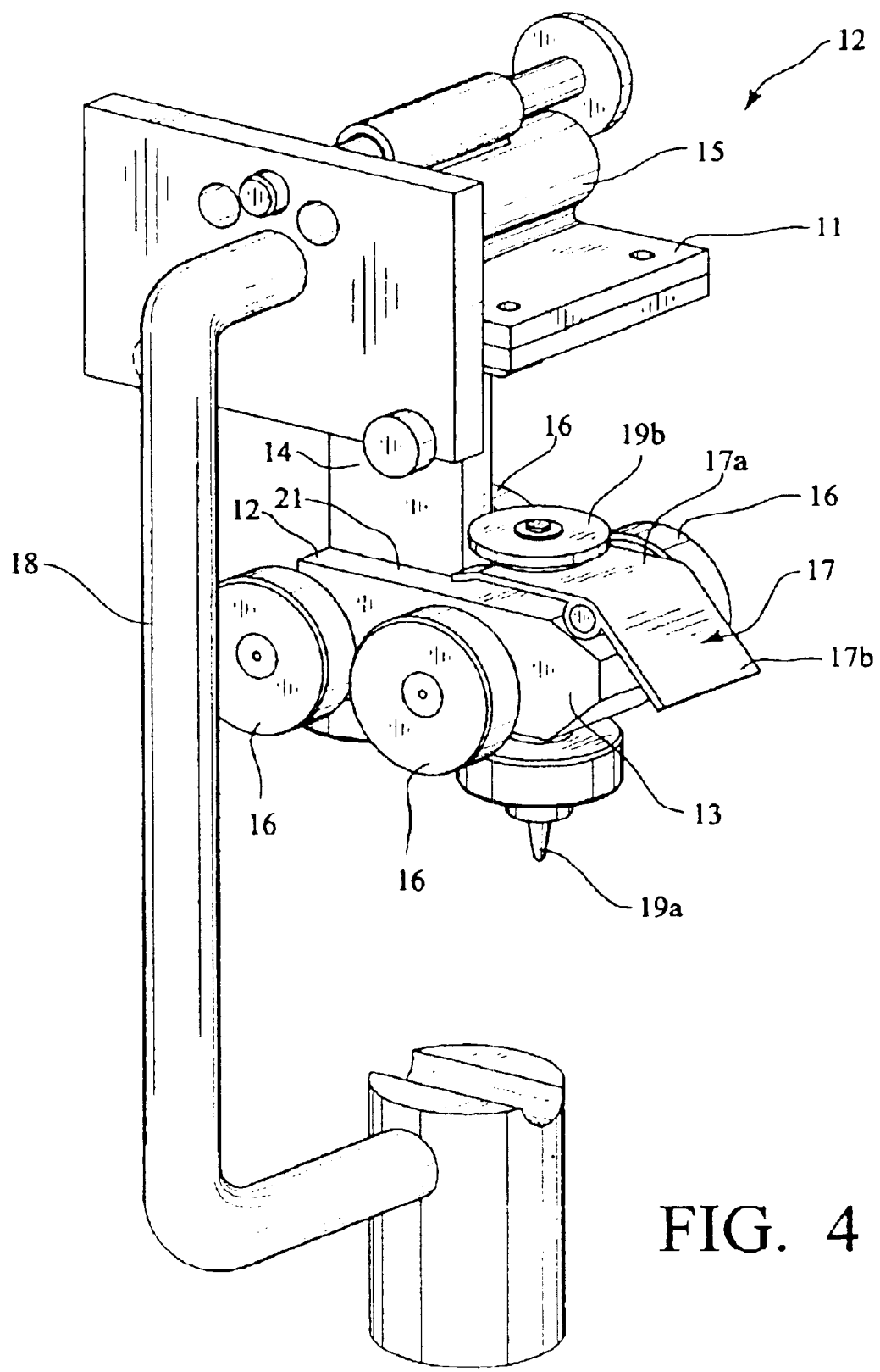
FIG. 4 shows a perspective view of a carrier trolley used in the present invention.
Figure 5:
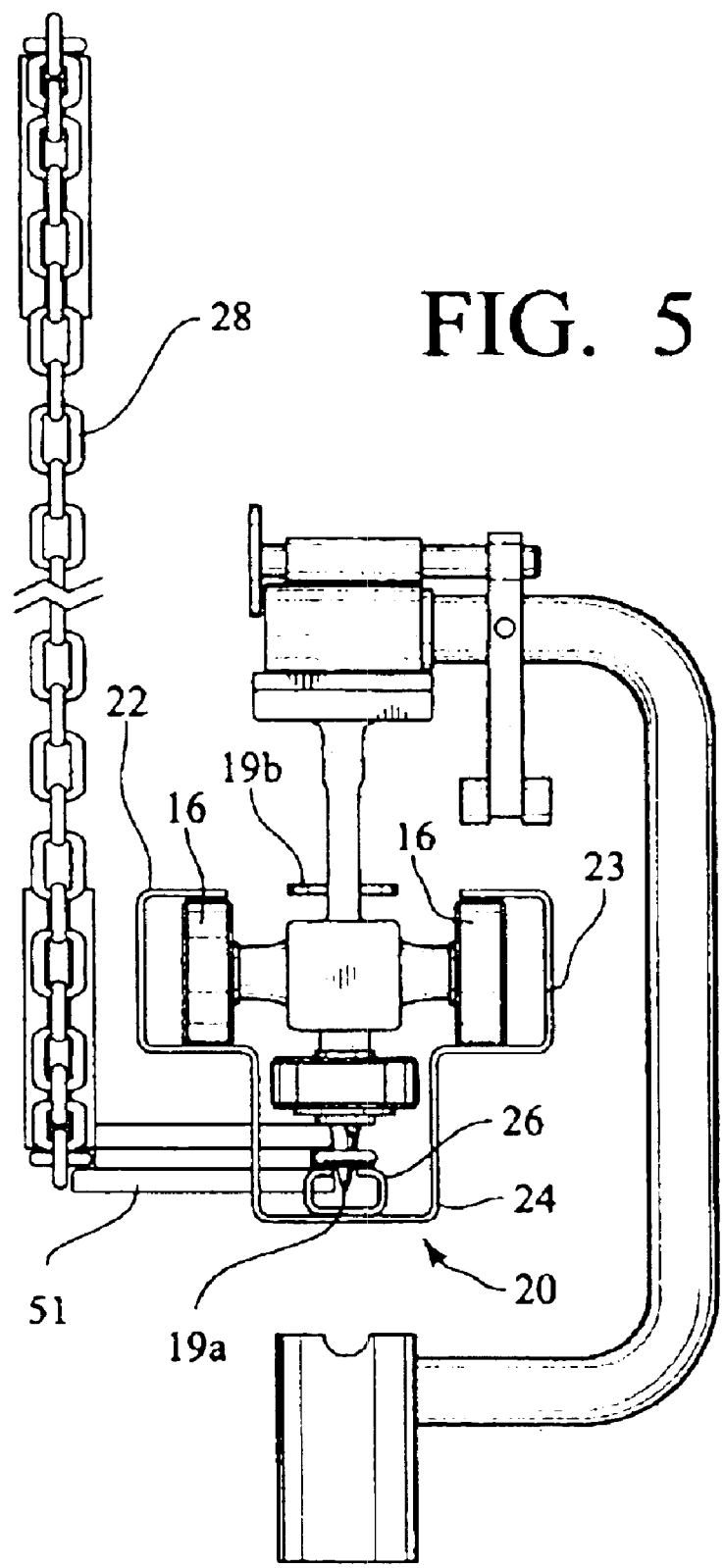
FIG. 5 shows an end view of the conveyor track used in the present invention with a carrier trolley disposed therein.
Figure 6A:
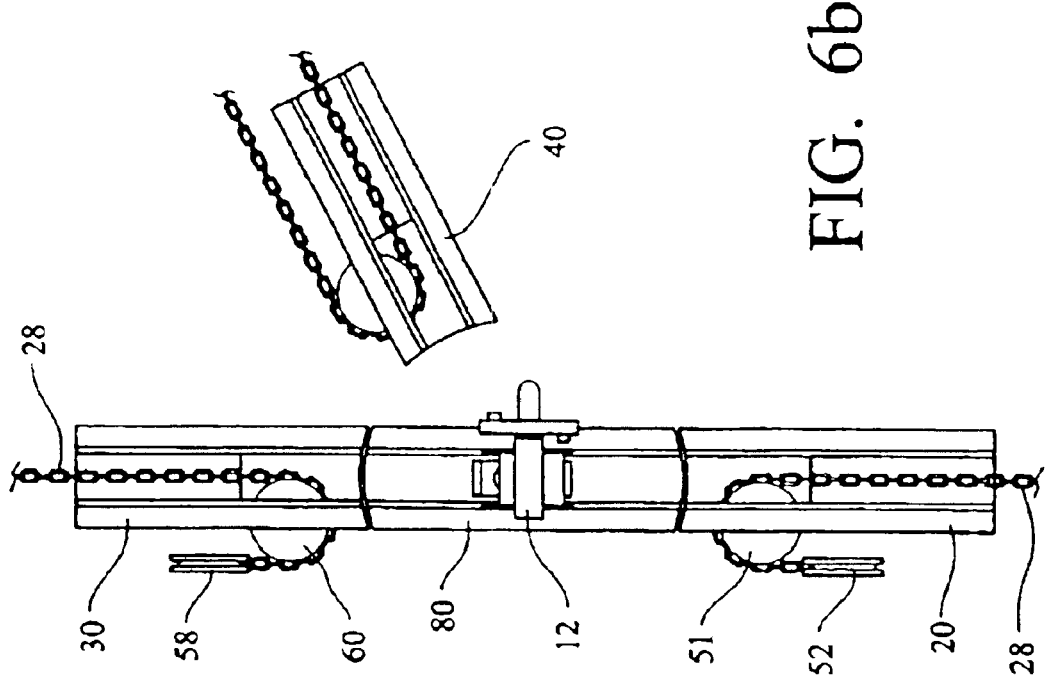
FIGS. 6a-6d show in plan view sequences of the rotating transfer track of the present invention as a carrier trolley moves from a first to a second or a third conveyor track.
Figure 6B:
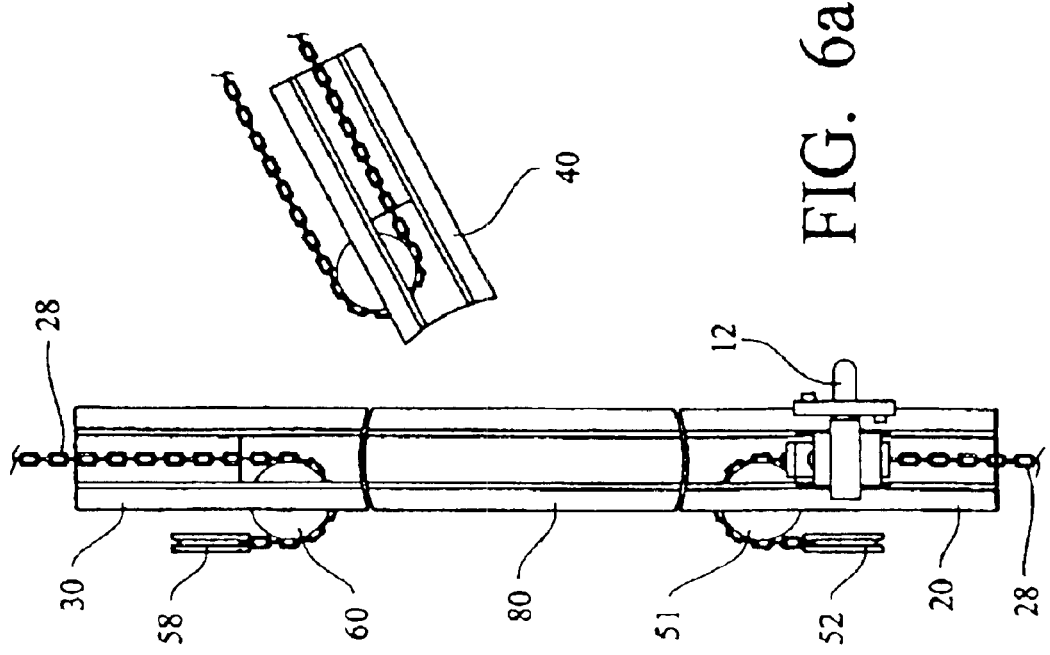
Figure 6C:
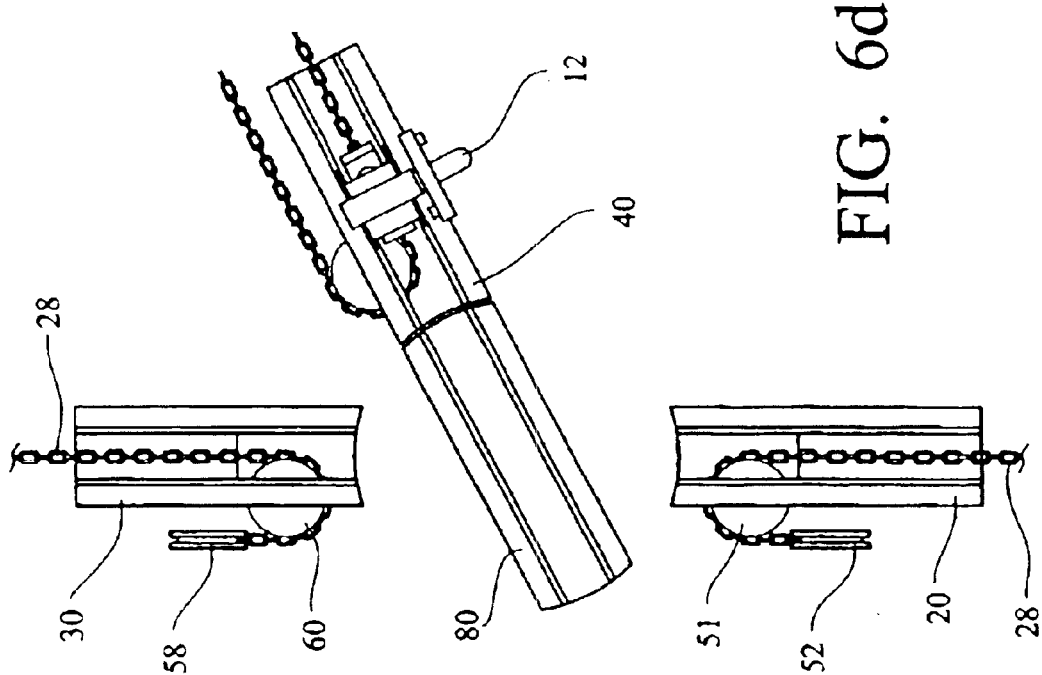
Figure 6D:
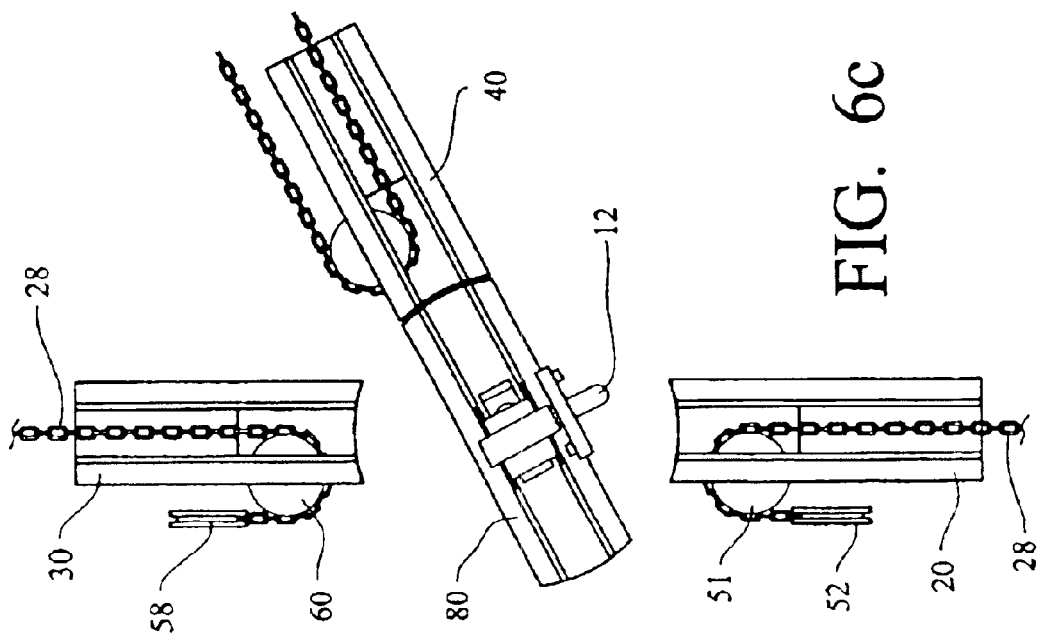

A carrier trolley 12 is shown in FIG. 5 traveling along the first conveyor 20. The carrier trolley 12, as best shown in FIG. 4, has a frame 13 having a substantially rectangular block shape, but may be any other shape which may be disposed within the conveyor tracks, as shown in FIG. 5. The carrier trolley frame 13 is preferably formed of cast iron, but may also be a lightweight, strong, corrosion resistant material desirable for use in manufacturing facilities. Extending from an upper surface of the frame 13 and integral therewith is an arm 14 having a load arm support platform 11 at an upper end. Attached to the load arm support platform 11 is a lug 15 preferably having a sleeve disposed therein. The sleeve acts as a journal bearing and may be formed of a plurality of materials suitable for use in a manufacturing facility. Extending through the lug 15, along an inner surface of the sleeve, in a pivotable connection is a C-shaped load arm 18 which may carry workpieces through a manufacturing facility. The lug 15 also functions as an engagement point for a pusher dog 78, which pushes the carrier trolley across the transfer conveyor track 80, and will be discussed further herein.

Near the front portion of frame 13 is a pin 19a which is slidably disposed and extends through the frame 13 to engage an endless chain 28 in conveyor tracks 20,30,40, as best shown in FIG. 5. The pin 19a has an upper portion with a pin flange 19b attached thereto. The pin flange 19b extends radially from the outer surface of the pin 19a and circumscribes the pin 19a. The pin flange 19b is preferably used to raise and lower the pin 19a, as will be discussed below, to engage and disengage the carrier trolley 12 from the conveyors 20,30,40.

A camming lever 17 is pivotably attached to the front portion of the carrier frame 13. The camming lever 17 has a first arm 17a and a second arm 17b which extend from the pivotal connection. The first arm 17a contacts the undersurface of the pin flange 19b to raise and lower the pin 19a with rotation of the camming lever 17.

Rotatably connected to the frame 13 are a plurality of wheels 16 which maintain the carrier in the conveyor track 20,30,40,80 and guide the carrier therethrough. Referring to FIG. 5, the wheels 16 preferably have a diameter slightly less than the distance across interior channels 22,23,24 such that the carrier trolley 12 remains centered in the conveyor track 20,30,40,80 and "play" or "slop" is inhibited therein.

Conveyor Track

As shown in FIG. 5, first conveyor track 20 is preferably of a substantially T-shaped structure. More specifically the T-shaped conveyor track is formed of three channel shapes 22,23,24 to form a substantially T-shaped track having an upper opening. The T-shaped track is preferably formed from a single sheet of steel wherein 90 degree bends are placed in forming the T-shaped structure. However, the T-shaped track, for instance first conveyor track 20, may also be formed from standard C-shaped channel iron which is welded together to form the T-shaped track. The enclosed arrangement of the substantially T-shaped track, for instance track 20, is preferable to contain grease, oil, dirt and other contaminants and inhibit their contact with a workpiece which is preferably carried below the conveyor track 20.

In the lower channel 24 of the conveyor track 20, is a conveying chain carrying channel 26. The chain carrying channel 26 is substantially square having an open upper portion wherein an endless chain 28 moves both along an upper surface of the chain channel 26 and partially within the open upper portion. A chain carrying channel 26 is preferably located in the first conveyor track 20, the second conveyor track 30, and the third conveyor track 40. However, there may not be a chain channel 26 positioned in the transfer conveyor track 80 since there is preferably no chain extending therethrough, as shown in FIG. 2. Near the end of first conveyor 20 may be a wedge or some other mechanism which raises the carrier pin 19a thereby disengaging the pin 19a from the chain 28 and maintains the disengaged position of pin 19a. As the carrier trolley 12 approaches the end of first conveyor 20 a signal maybe sent to a programmable logic controller (PLC) which starts rotation of the endless transfer chain 76, and in turn pusher dogs 78.

Rotatable Transfer Conveying Mechanism

As shown in FIGS. 2,3 a structural steel support assembly 82 is shown from which the rotatable transfer track 70 depends. The design of the structural steel support assembly 82 may be dependent on the characteristics of the workpieces being moved through a manufacturing facility and the loading associated therewith as will be recognized by one skilled in the art.

Referring to FIGS. 1,3, the transfer track 70 includes a transfer support arm 71 which is comprised of a pair of substantially reverse C-shaped structures or legs with an upper plate 100 connecting the C-shaped structures. Above the upper plate 100 is a sprocket 110 which is preferably operably connected thereto. The sprocket 110 is operably connected to a chain 109 and motor 106 to rotate the transfer conveying mechanism 70. The chain 109 and motor 106 are sized based on the loading applied to the transfer conveying mechanism 70 as is well known in the art. Extending from the sprocket 110 are a plurality of blocks 112, each of which has at least one, preferably two, cam followers 114 rotatable attached thereto, as best shown in FIG. 2.

Above the sprocket 110 is a pivot plate 116 which is positioned to pass between the two cam followers 114 of each block 112. In other words, the blocks 112 and cam followers 114 rotatably support the structure beneath the blocks 112. Attached to the upper surface of pivot plate 116 is at least one structural member 118, in one exemplary embodiment, a pair of angle irons. The angle irons 118 may be bolted or welded to the pivot plate 116. The angle irons 118 may also be attached to support assembly 82, as shown in FIG. 3, with the transfer track 70 depending therefrom. Preferably, as shown in FIG. 1, the angle irons 118 are disposed in a spaced configuration wherein a beam may be fitted and bolted or welded into place therebetween. The motor 106 and a motor sprocket 108 are positioned along the support assembly 82 with a chain 109 operably connected between the motor sprocket and the sprocket 110 in order to rotate the transfer track 70. As the chain 109 causes the sprocket 110 to rotate, the cam followers 114 maintain the transfer track 70 in a level disposition and also allow the transfer track 70 to rotate relative to the support assembly 82.

As shown in FIG. 1, positioned on lower legs of the transfer support arm 71 is a transfer track segment 80. Attached across the lower legs of the support arm 71 are a pair of square or rectangular tubes 75 which support and stabilize the transfer track segment 80. The tubes 75 are preferably sized to support transfer track segment 80. The transfer track 80 has a substantially T-shaped form wherein a carrier trolley 12 may ride and may be bent or formed from three channels as discussed above. The ends of transfer track segment 80 are also rounded to facilitate rotation of the transfer track segment 80 between a plurality of conveyor tracks 20,30,40 without "catching" or damaging the tracks 80,20,30,40.

In contrast to the first and second conveyor tracks 20,30 the conveyor transfer track 80 does not have a chain channel 26 therein since the carrier pin 19a is disengaged as the carrier trolley 12 moves across the transfer track segment 80. However, there may be a protuberance or some other mechanism which maintains the carrier pin 19a in an upward position as the carrier 12 moves therethrough.

The rotatable transfer track 70 may be rotated in a plurality of ways. The transfer mechanism 70 may be rotated by a chain 109 and drive motor 106 as discussed above. The transfer mechanism 70 may also be rotated by motor and gear transmission, or by placing a force on the support arm 71 by either compressed air piston-cylinder or hydraulic piston-cylinder.

Referring back to FIG. 1, the transfer mechanism 70 includes a support arm 71, a first and a second transfer sprocket 72,74, an endless transfer chain 76 and pusher dogs 78. The support arm 71, as discussed above, is preferably formed of a C-channel member. Within the upper portion of the support arm 71 is a chain guide 73. The chain guide 73 is preferably formed of a metal tubing frame having a rectangular shape. The chain guide 73 is positioned directly above the transfer track 80. Rotatably connected to the arms 77 of the chain guide 73 are the first and the second transfer sprockets 72,74. The sprockets 72,74 are positioned on axles extending from the arms 77 and preferably have parallel teeth for use with an endless transfer chain 76 which is a dual strand roller link chain for use in high torque applications.

Operably engaging the first and second transfer sprockets 72,74 is an endless transfer chain 76. The endless chain 76 is preferably a dual strand roller link chain but may be a single strand chain depending on the necessary torque requirements. The endless transfer chain 76 and sprockets 72,74 may be operably connected to a motor and drive sized for the specific need of the system as well known in the art. Attached to the endless transfer chain 76 are a plurality of pusher dogs 78. The pusher dogs 78 may be of plurality of shapes but are preferably substantially triangular. As the carrier 12 approaches the end of first conveyor 20, it engages pusher dog 78. As the pusher dog 78 contacts the lug 15, carrier 12 is pushed across a transfer track segment 80 to either the second conveyor track 30 or the third conveyor track 40 which is disposed at an angle to the first conveyor track 20, as shown in FIG. 2.

The instant invention also comprises a means for carrying an endless chain 28 from the first conveyor 20 to the second conveyor 30 such that it does not contact the transfer mechanism 70. As shown in FIGS. 2, 6a-6d a plurality of sprockets 51,52,54,56,58,60 direct the endless chain 28 from a first conveyor 20 to a second conveyor 30. As the chain 28 moves toward the end of the first conveyor 20, it encounters a first sprocket 51 which changes the path of chain 28 by 180 degrees. As the chain 28 continues it encounters sprocket 52 which directs the chain 28 upward 90 degrees. As the chain 28 moves upward it next engages sprocket 54 at an uppermost path and changes the travel path of chain 28 by about 90 degrees such that the chain 28 moves horizontally toward the second conveyor 30. When the chain 28 clears the transfer mechanism 70, the chain 28 engages sprocket 56 which changes the path of the chain 28 by about 90 degrees such that it moves downward to a lower most path. The chain 28 next engages sprocket 58 which directs chain 28 horizontally by changing the path about 90 degrees. Finally, the chain 28 engages sprocket 60 where the chain path is changed by about 180 degrees and the chain 28 enters second conveyor track 30. From this position a carrier 12 may re-engage the chain 28 as it moves from the transfer track 80 to the second conveyor 30. One skilled in the art will recognize that a plurality of sprockets may be used in varying positions to direct the chain 28 in a manner so as to prevent its contact with the various parts of the rotatable transfer track device 10.

In use, the carrier trolley 12 is pulled along the first conveyor 20 by chain 28 as seen in FIG. 2 and FIGS. 6a-6d, with structure removed for clarity. As the transfer chain 76 rotates a dog 78 will contact lug 15 near the second end of first conveyor 20. A PLC may be programmed to rotate the transfer chain 76 continuously or only when a carrier 12 approaches the transfer mechanism 70 when a sensor is placed near the transfer conveying mechanism. Since the carrier 12 may become disengaged from the chain 28 by a wedge or some other means as described above, the dog 78 pushes the carrier 12 into and across the transfer track 80. As the carrier 12 moves across transfer track 80 a PLC may determine, based on manufacturing conditions, if the carrier 12 should move to second conveyor 30 or third conveyor 40 or even some other conveyor which may be disposed adjacent the transfer mechanism 70. Upon making this determination the PLC may activate a motor 106 and chain 109 transmission system as in FIG. 3, a hydraulic system, a compressed air system or the like causing the transfer support arm 71 to rotate. The transfer support arm 71 will preferably rotate until transfer conveyor track 80 is aligned with the second conveyor track 30, the third conveyor track 40 or some other conveyor track. As the carrier 12 is pushed across transfer track 80 it will next move to the second conveyor 30, the third conveyor 40 or some other conveyor as preselected by the PLC. Upon entering the second conveyor track 30, for example, the carrier pin 19a engages chain 28 which then pulls the carrier 12 along the conveyor path.

Figure 8:
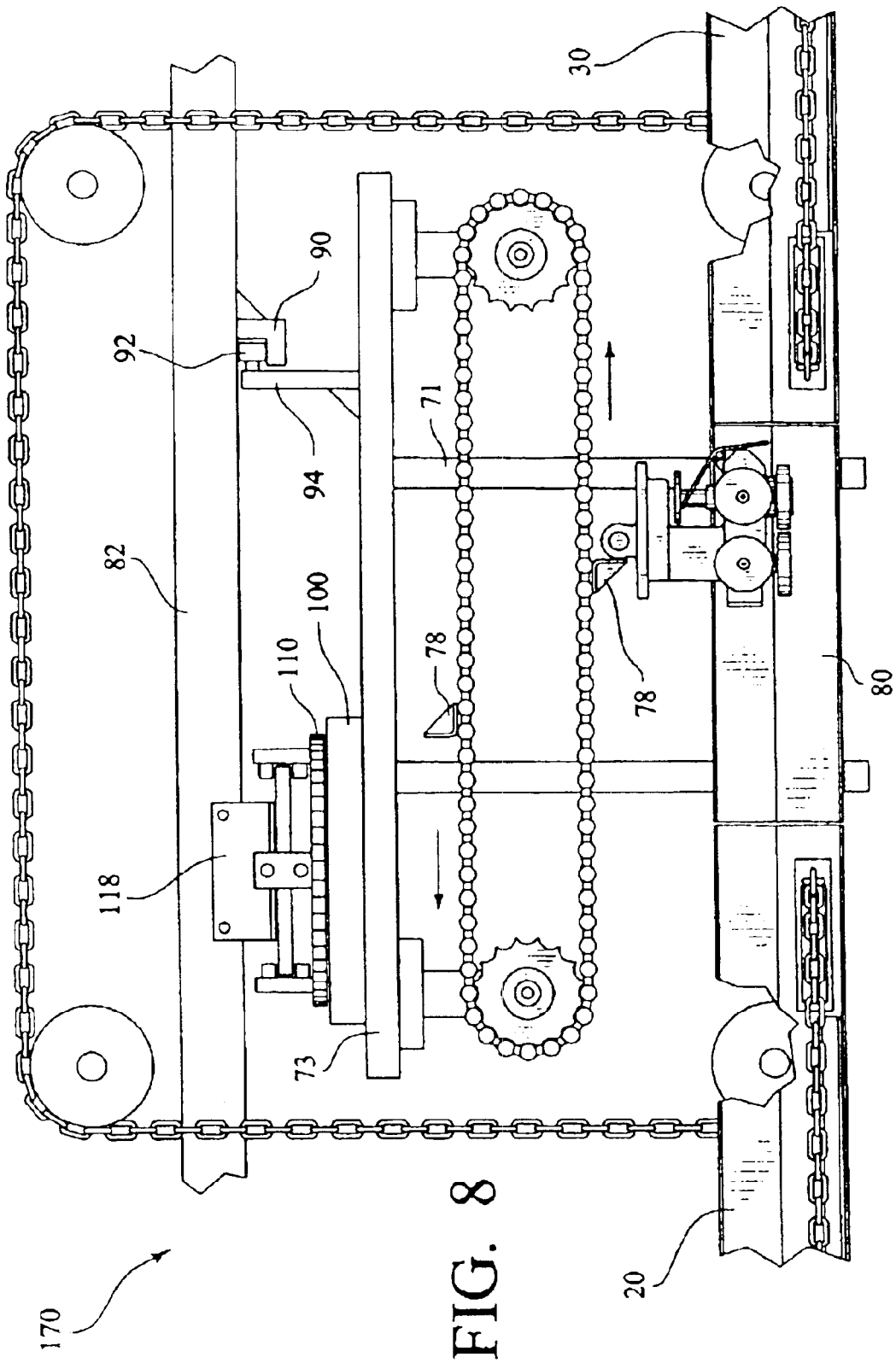
FIG. 8 shows a side view of the alternative embodiment of FIG. 7.
Figure 9B:
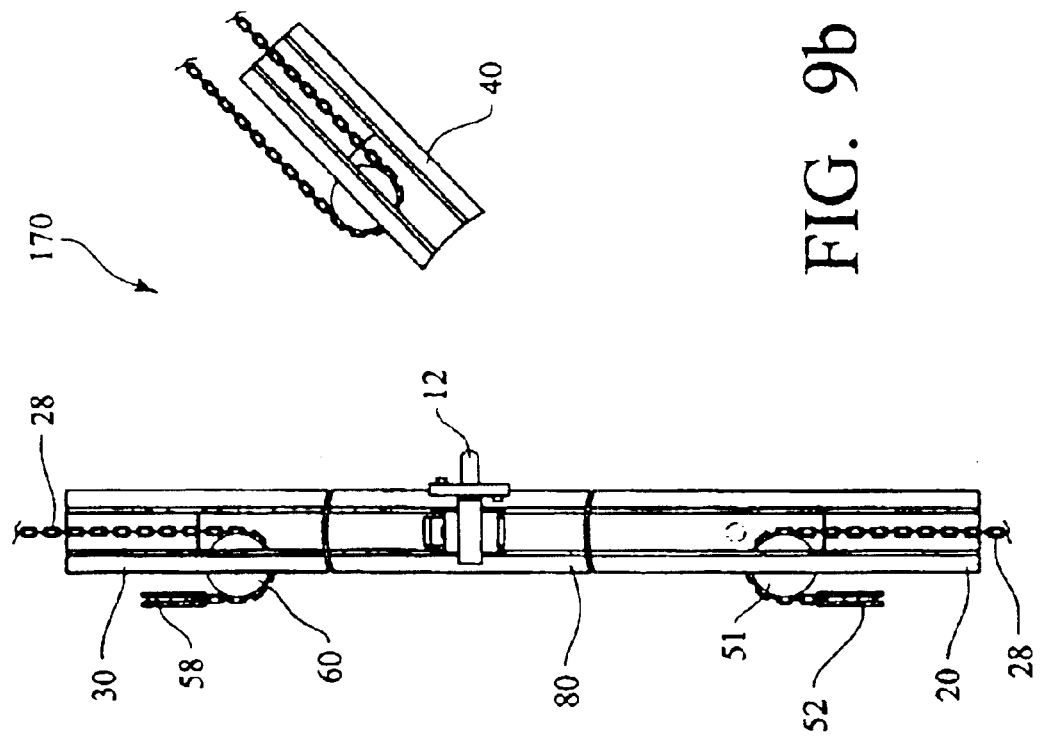
FIGS. 9a-9d show in plan view sequences the alternative embodiment of a rotating transfer track.
Figure 9A:
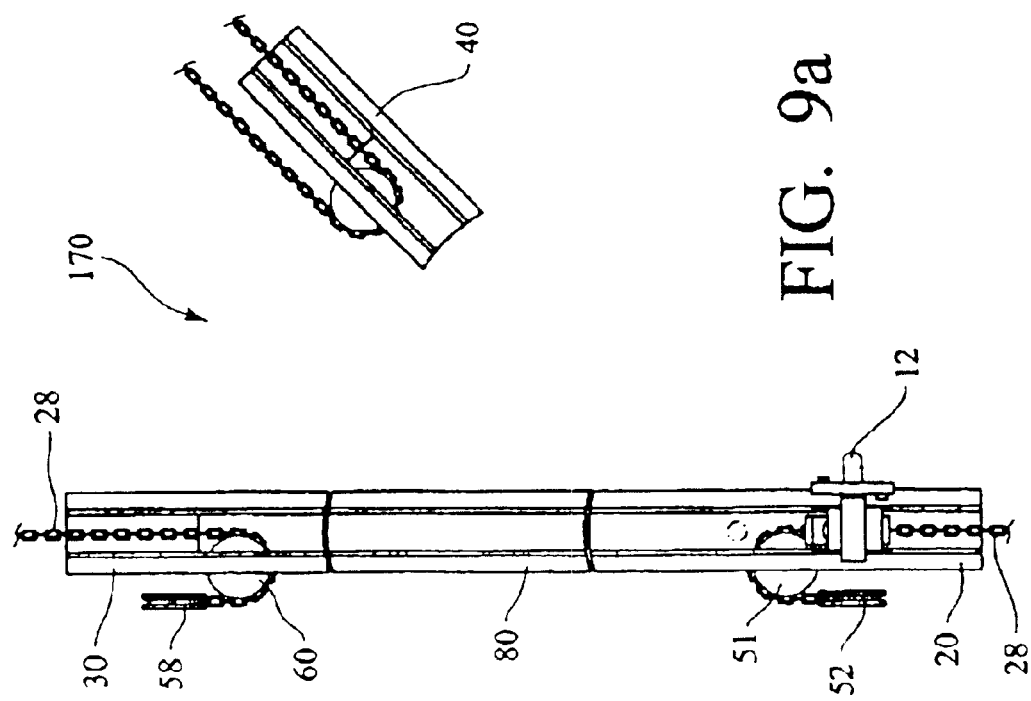
Figure 9C:
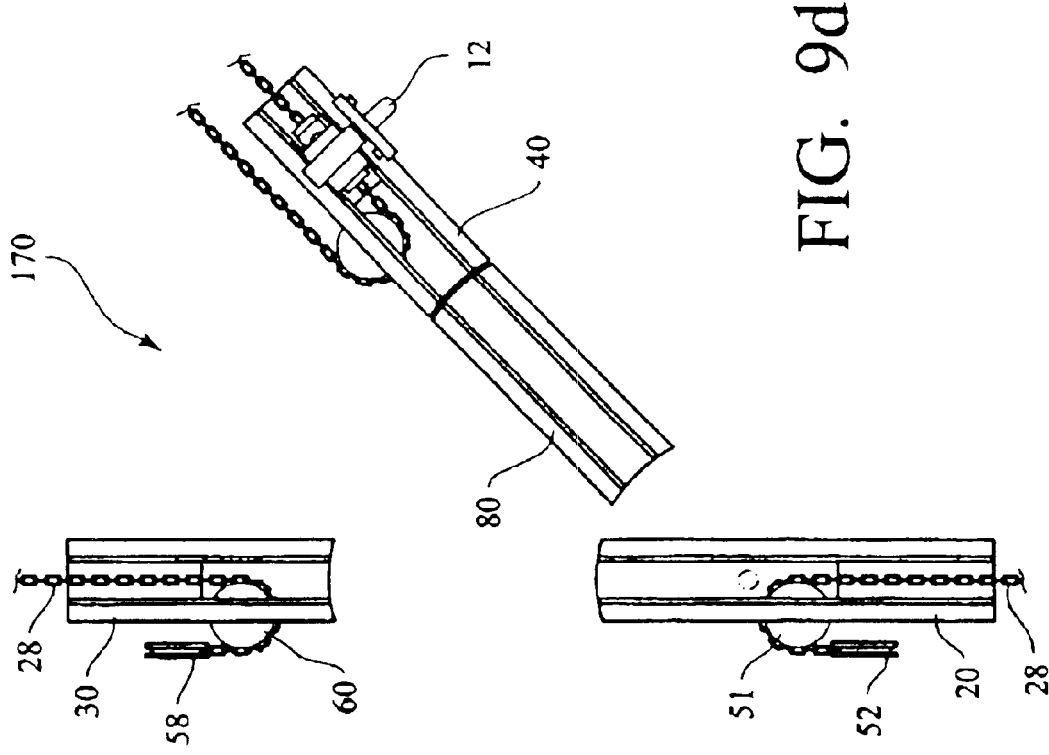
Figure 9D:
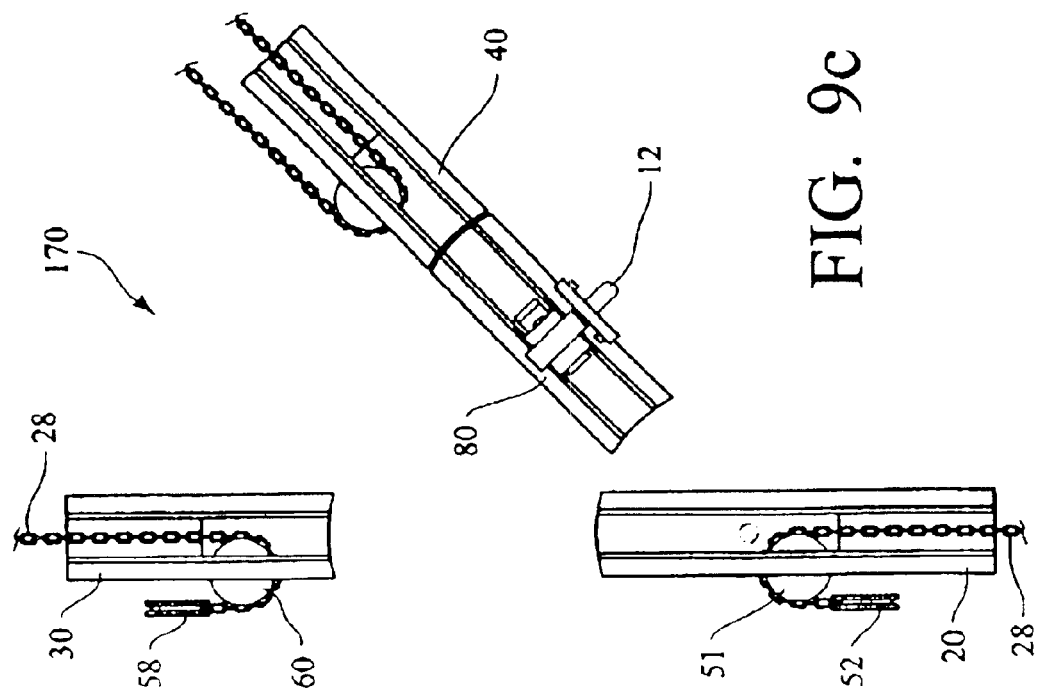

In an alternative embodiment, shown in FIGS. 8,9, the pivoting location of a transfer mechanism 170 is positioned above an end of the transfer track 180, preferably above first conveyor 20, as best shown in FIG. 8. In order to change the pivot position the upper plate 100 may be moved thereby moving all of the mechanical structure above. Next the angle iron 118 is attached to the structural steel 82. The pivot position may be centered above the first conveyor 20 to allow proper alignment between the first and second conveyors 20,30 or other conveyors such as conveyor 40 and transfer track 80.

Figure 7:
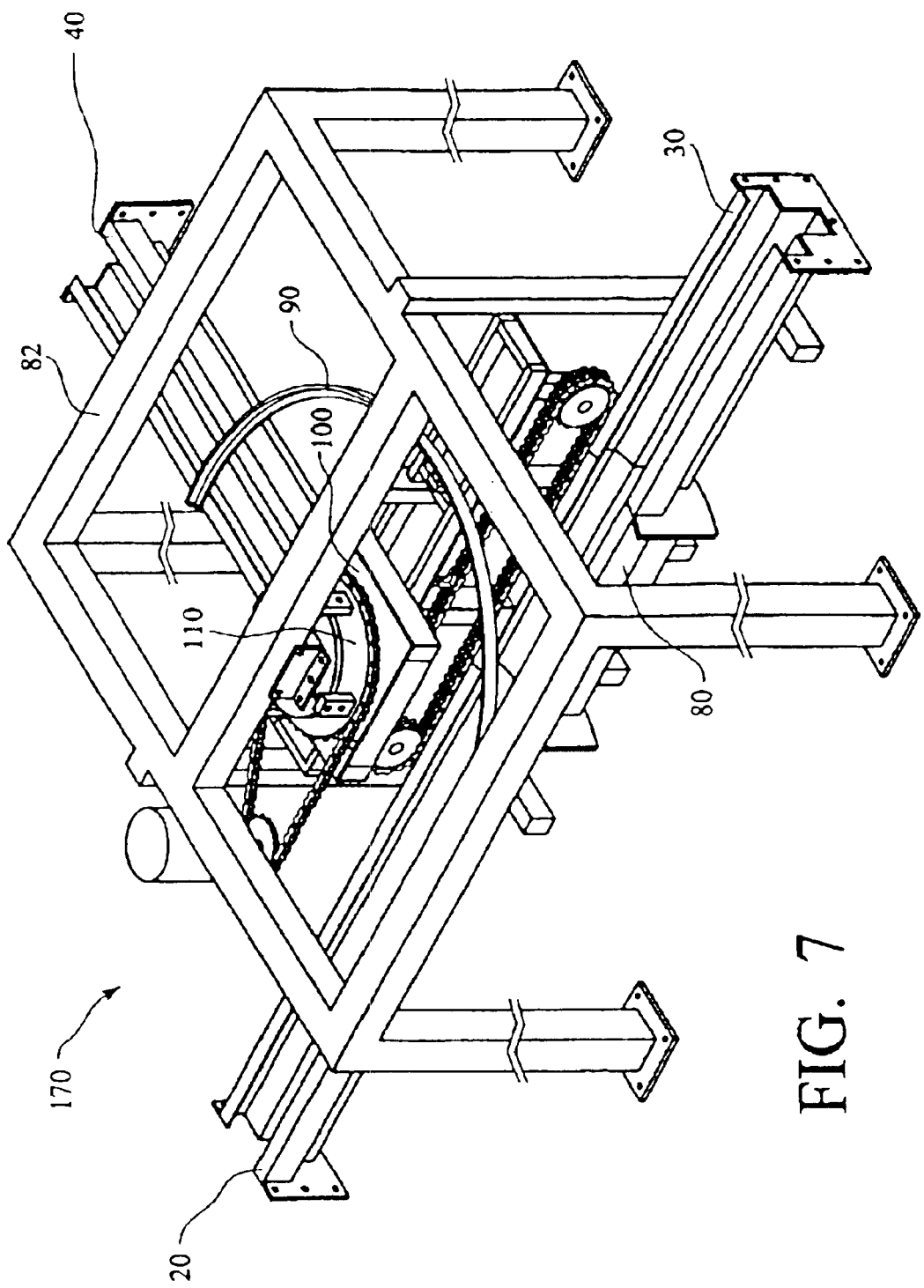
FIG. 7 shows a perspective view of an alternative embodiment of a rotatable transfer track of the present invention.

As shown in FIGS. 7,8, when the support arm 71 is pivoted from a first end, a cantilever loading is created. A camming track 90 and cam follower 92 may be used to offset the cantilever load at the pivot allowing easy rotation of the support arm 71. Extending from the top surface of the chain guide 73 is a cam support 94 from which a cam follower 92 extends. The cam follower 92 may be rotatably connected to the cam support 94 by preferably, an axle and bearing. The cam follower 92 is seated and rides within the camming track 90 to support the arm 71 opposite the pivot at sprocket 110.

In order to support the transfer mechanism 170 and transfer conveyor track 80 in a rotated position the support assembly 82 may extend above all positions through which the transfer conveying mechanism 70 and transfer conveyor track 80 may rotate. To facilitate rotation of the transfer mechanism 70 and the transfer track 80, the camming track 90 depends from a lower surface of the support assembly 82 extending in an arc shape. The camming track 90 may be welded or bolted to the support assembly 82 or fastened by some other means which will be known by one skilled in the art. The camming track 90 is preferably L-shaped and formed of steel. The camming track 90 may have a length which is dependent on the arc through which the transfer conveying mechanism 70 and transfer conveyor track 80 rotate. In other words the length of the camming track 90 is preferably slightly longer than an arc through which the track 80 and transfer conveying mechanism 170 rotate.

Referring now to FIGS. 9a-9d, a plan view sequence is shown. Much of the structure is removed for clarity. As described above a carrier 12 approaches an end of first conveyor 20 and disengages from chain 28. After the carrier 12 is disengaged, the dogs 78 move carrier 12 into transfer track 80. A PLC may determine which track to align transfer track 80 with, in this example conveyor track 40. The carrier 12 is pushed to track 40 where it continues along a preselected path.

Beneath the conveyor track 80 may be a plurality of support rollers. The rollers may provide support for conveyor track 80 as it rotates through a preselected arc.

The foregoing detailed description is given primarily for clearness of understanding and no unnecessary limitations are to be understood therefrom for modifications will become obvious those skilled in the art upon reading this disclosure and may be made without departing from the spirit of the invention and scope of the appended claims.

I claim:

1. A rotatable transfer track device, comprising:
   a structural steel support assembly;
   a rotary mount rotatably depending from said structural steel support assembly;
   at least one transfer support arm depending from said rotary mount;
   a transfer track supported by said at least one transfer support arm; and
   a motor having a chain drive connected to said motor, said chain drive rotating said rotary mount.

2. The rotatable transfer track device of claim 1, said transfer track aligned with an at least first track and an at least second track.

3. The rotatable transfer track device of claim 1, said rotary mount including first and second structural members connecting said structural steel support assembly to a pivot plate.

4. The rotatable transfer track device of claim 3, said first and second structural members being first and second angle irons.

5. The rotatable transfer track device of claim 1, said rotary mount including a sprocket having a plurality of blocks extending from an upper surface of said sprocket.

6. The rotatable transfer track device of claim 5, each of said blocks having at least one cam follower extending from an inner surface.

7. The rotatable transfer track device of claim 6, said blocks each having two cam followers.

8. The rotatable transfer track device of claim 1, a pivot plate depending from at least one angle iron, said pivot plate disposed between first and second cam followers.

9. The rotatable transfer track device of claim 1, a chain guide centered on said at least one transfer support arm.

10. The rotatable transfer track device of claim 1, said at least one transfer support arm having a substantially reverse C-shape and an upper plate extending above said transfer support arm.

11. The rotatable transfer track device of claim 1 further comprising a transfer mechanism depending from said at least one transfer support arm.

12. The rotatable transfer track device of claim 11, said transfer mechanism having first and second transfer sprockets rotatable connected to a chain guide, said chain guide depending from said at least one transfer support arm.

13. The rotatable transfer track device of claim 12, further comprising a chain extending about first and second transfer sprockets.

14. The rotatable transfer track device of claim 1, a chain guide rotatably cantilevered from an upper leg of said at least one transfer support arm.

15. The rotatable transfer track device of claim 14, further comprising a cam support extending from a top surface of said chain guide opposite said cantilevered connection.

16. The rotatable transfer track device of claim 15, a cam follower rotatably connected to said cam support and seated on a camming track.

17. A rotatable transfer track device, comprising:
    a structural steel support assembly;
    a rotary mount pivotably depending from said support assembly;
    at least one transfer support arm depending from said rotary mount;
    a transfer track supported by said at least one transfer support arm;
    said transfer track aligned with an at least first track and an at least second track;
    a transfer mechanism depending from said transfer support arm; and
    a motor connected to said structural steel support assembly, and a chain drive connecting said motor to said rotary mount.

18. The rotatable transfer track device of claim 17 said rotary mount including at least one structural member connecting said structural steel support assembly to a pivot plate.

19. The rotatable transfer track device of claim 18, further comprising a pivot plate depending from said at least one structural member and disposed between first and second cam followers.

20. The rotatable transfer track device of claim 18, said at least one structural member being first and second angle irons.

21. The rotatable transfer track device of claim 18, said rotary mount including a sprocket having a plurality of blocks extending from an upper surface of said sprocket.

22. The rotatable transfer track device of claim 18, further comprising a cam support extending from a top surface of a chain guide opposite a cantilevered connection.

23. The rotatable transfer track device of claim 22, cam follower rotatably connected to said cam support and seated on a camming track.

24. The rotatable transfer track device of claim 17, said at least one transfer support arm depending from said rotary mount and having a substantially reverse C-shape.

25. The rotatable transfer track device of claim 24, said at least one transfer support arm having an upper plate extending across said support arm and connected to said rotary mount.

26. The rotatable transfer track device of claim 17, said transfer mechanism having a chain guide, first and second transfer sprockets, and a transfer chain extending about said first and second transfer sprockets.

27. The rotatable transfer track device of claim 26, said chain guide defined by a substantially rectangular shaped metal tubing frame.

* * * * *